(12) United States Patent
Galbo et al.

(10) Patent No.: US 8,918,600 B2
(45) Date of Patent: *Dec. 23, 2014

(54) METHODS FOR CONTROLLING HOST MEMORY ACCESS WITH MEMORY DEVICES AND SYSTEMS

(75) Inventors: Neal A. Galbo, Boca Raton, FL (US); Peter Feeley, Boise, ID (US); William H. Radke, Los Gatos, CA (US); Victor Y. Tsai, Palo Alto, CA (US); Robert N. Leibowitz, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,671

(22) Filed: Jul. 17, 2012

(65) Prior Publication Data
US 2012/0284466 A1    Nov. 8, 2012

Related U.S. Application Data

(63) Continuation of application No. 12/477,204, filed on Jun. 3, 2009, now Pat. No. 8,225,052.

(51) Int. Cl.
*G06F 12/00* (2006.01)
*G06F 13/16* (2006.01)

(52) U.S. Cl.
CPC .................................. *G06F 13/1642* (2013.01)
USPC .......................................... 711/156; 710/310

(58) Field of Classification Search
CPC ... G06F 12/00; G06F 3/0631; G06F 13/1642; G06F 3/061; G06F 13/42; G11C 7/00

USPC .......................................... 711/156; 710/310
See application file for complete search history.

(56) References Cited

U.S. PATENT DOCUMENTS

| 4,425,615 | A | * | 1/1984 | Swenson et al. ............... 711/114 |
| 4,682,284 | A | * | 7/1987 | Schrofer .......................... 710/55 |
| 5,802,345 | A | * | 9/1998 | Matsunami et al. ............ 703/27 |
| 5,968,143 | A | | 10/1999 | Chisholm et al. |
| 6,058,489 | A | * | 5/2000 | Schultz et al. ............... 714/6.32 |
| 6,212,593 | B1 | | 4/2001 | Pham et al. |
| 6,334,162 | B1 | | 12/2001 | Garrett et al. |
| 6,374,313 | B1 | * | 4/2002 | Popat .............................. 710/52 |

(Continued)

FOREIGN PATENT DOCUMENTS

| EP | 1782217 B1 | 12/2008 |
| JP | 09-160861 | 8/1997 |

(Continued)

OTHER PUBLICATIONS

European Search Report and Opinion for related European Application No. 10783693.4, mailed Apr. 8, 2013, (9 pgs.).

(Continued)

*Primary Examiner* — Hashem Farrokh
(74) *Attorney, Agent, or Firm* — Brooks, Cameron & Huebsch, PLLC

(57) ABSTRACT

The present disclosure includes methods for controlling host memory access with a memory device, systems, host controllers and memory devices. One embodiment for controlling host memory access with a memory device includes receiving at least one command from a host and controlling execution of the at least one command with the memory device.

24 Claims, 2 Drawing Sheets

(56) References Cited

U.S. PATENT DOCUMENTS

| | | | |
|---|---|---|---|
| 6,810,443 | B2 | 10/2004 | Bennett |
| 6,985,778 | B2 | 1/2006 | Kim et al. |
| 6,996,820 | B1 * | 2/2006 | Middleton et al. ............ 718/100 |
| 7,149,844 | B2 | 12/2006 | Bernardi et al. |
| 7,219,285 | B2 | 5/2007 | Tanaka et al. |
| 7,290,082 | B2 | 10/2007 | Kwon |
| 7,428,610 | B2 | 9/2008 | Pedersen et al. |
| 7,475,167 | B2 * | 1/2009 | Wunderlich et al. ............ 710/33 |
| 7,673,080 | B1 | 3/2010 | Yu et al. |
| 7,689,738 | B1 * | 3/2010 | Williams et al. ................ 710/52 |
| 7,856,519 | B2 | 12/2010 | Tan et al. |
| 2003/0097514 | A1 | 5/2003 | Ennis et al. |
| 2004/0122988 | A1 | 6/2004 | Han et al. |
| 2004/0128409 | A1 | 7/2004 | Bennett |
| 2008/0028133 | A1 | 1/2008 | Kwon |
| 2008/0183954 | A1 | 7/2008 | Lee et al. |
| 2008/0301381 | A1 | 12/2008 | Lee et al. |
| 2009/0037689 | A1 | 2/2009 | Kanuri |
| 2009/0089489 | A1 | 4/2009 | Mukaida et al. |
| 2009/0094411 | A1 | 4/2009 | Que |
| 2010/0011137 | A1 * | 1/2010 | McGowan .................... 710/105 |
| 2010/0191874 | A1 | 7/2010 | Feeley et al. |

FOREIGN PATENT DOCUMENTS

| | | |
|---|---|---|
| JP | 2003-524999 | 8/2003 |
| JP | 2003-256273 | 9/2003 |
| JP | 2006512674 A | 4/2006 |
| JP | 2009-086738 | 4/2009 |
| TW | I285815 | 8/2007 |
| TW | 200734880 | 9/2007 |
| TW | 200921395 | 5/2009 |
| WO | 01/63836 | 8/2001 |
| WO | 2004-061688 A1 | 7/2004 |

OTHER PUBLICATIONS

Korean Preliminary Rejection for related Korean Application No. 10-2012-7000024, mailed Feb. 20, 2013, (5 pgs.).

Japanese Search Report and Opinion for related Japanese Application No. 2012-513924 mailed May 28, 2013 (4 pgs.).

Korean Office Action for related Korean Application No. 10-2012-7000024, dated Aug. 13, 2013, 4 pages.

Japanese Office Action for related Japanese Application No. 2012-513924, dated Sep. 17, 2013, 3 pages.

Taiwanese Office Action for related Taiwanese Application No. 099117986, dated Sep. 2, 2013, 4 pages.

Office Action for related Chinese Application No. 201080024691.9, dated Nov. 5, 2013, 21 pages.

Examination Report from related European patent application No. 10783693.4, dated Jun. 3, 2014, 4 pp.

International Search Report and Written Opinion for Related PCT Application No. PCT/US2010/001521, mailed Jan. 6, 2011 (10 pages).

Decision of Dismissal of Amendment from related Japanese patent application No. 2012-513924, mailed Apr. 15, 2014, 5 pp.

Decision of Rejection from related Japanese patent application No. 2012-513924, mailed Apr. 15, 2014, 2 pp.

* cited by examiner

METHODS FOR CONTROLLING HOST MEMORY ACCESS WITH MEMORY DEVICES AND SYSTEMS

PRIORITY APPLICATION INFORMATION

This application is a Continuation of U.S. application Ser. No. 12/477,204, filed Jun. 3, 2009, now U.S. Pat. No. 8,225,052, the specification of which is incorporated herein by reference.

TECHNICAL FIELD

The present disclosure relates generally to semiconductor memory devices, methods, and systems, and more particularly, to memory device controlled host memory access.

BACKGROUND

Memory devices are typically provided as internal, semiconductor, integrated circuits and/or external removable devices in computers, personal digital assistants (PDAs), digital cameras, and cellular telephones, among various other electronic devices. There are many different types of memory including random-access memory (RAM), read only memory (ROM), dynamic random access memory (DRAM), synchronous dynamic random access memory (SDRAM), phase change random access memory (PCRAM), and flash memory, among others.

Flash memory devices are utilized as non-volatile memory for a wide range of electronic applications. Flash memory devices typically use a one-transistor memory cell that allows for high memory densities, high reliability, and low power consumption.

Various types of memory can be used in memory systems. The various types of memory can be used in any combination to provide memory for a host, such as a host device or host system. For example, Flash memory can be included in a memory system. Flash memory can be part of a memory system as internal memory or as removable memory that can be coupled to the memory system through an interface, such as a USB connection.

A system can include a host system, host memory, and a number of external memory devices. The host system can have a number of processors, a host controller, host controller memory that is located on the host controller, and a number of internal memory devices. The host system can use the internal and/or external memory devices by interacting with the memory devices via a host controller and/or a number of host processors. The host controller and/or a number of host processors can communicate with the memory devices to perform operations on the memory devices, such as reading data from the memory devices to the host or writing data from the host to the memory devices. The commands that control the reading and writing of data can be built by the host. The host controller and/or a number of host processors can have hardware that controls the execution of the commands. In such cases when a host controller and/or a number of host processors have hardware that controls the execution of the commands, the host system manages and maintains the state of the memory devices.

DETAILED DESCRIPTION

Figure 1:
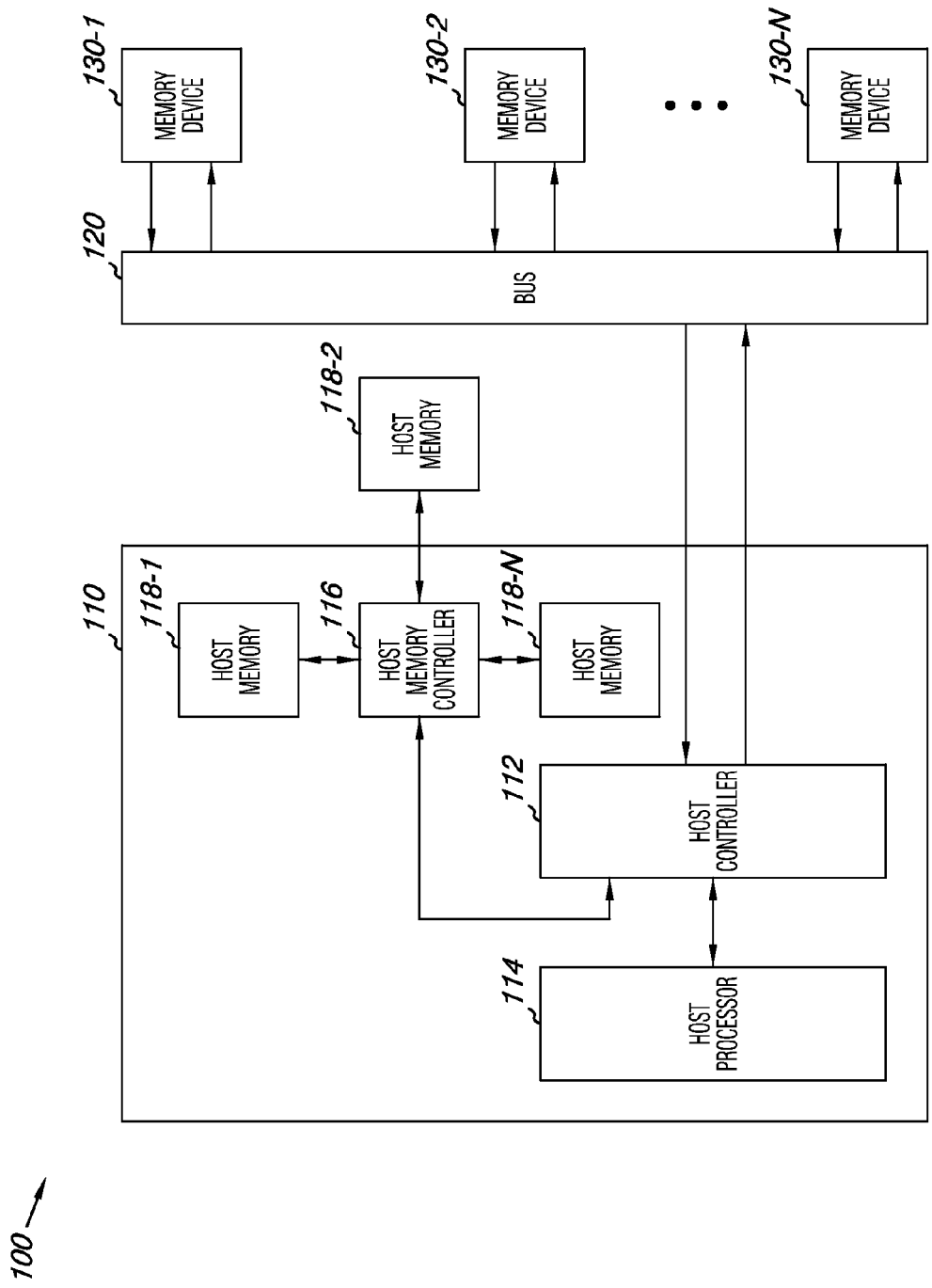
FIG. 1 illustrates a block diagram of a memory in accordance with one or more embodiments of the present disclosure.

The present disclosure includes methods, devices, and systems for controlling host memory access with a memory device. One embodiment for controlling host memory access with a memory device includes receiving at least one command from a host and controlling execution of at least one command with the memory device.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N," particularly with respect to reference numerals in the drawings, indicates that a number of the particular feature so designated can be included with one or more embodiments of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 118 may reference element "18" in FIG. 1, and a similar element may be referenced as 218 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

FIG. 1 illustrates a block diagram of a memory system 100 in accordance with one or more embodiments of the present disclosure. In FIG. 1, a host 110 is shown. In one or more embodiments, the host 110 can be a computing device, such as a personal computer, among other computing device types. Examples of a host 110 include laptop computers, personal computers, mobile phone, digital cameras, digital recording and play back devices, PDA's, memory card readers, and interface hubs, among other examples. The host 110 of FIG. 1 includes a host controller 112, a host processor 114, host memory controller 116, and host memory 118-1 and 118-N, among other computing device elements not shown. The host controller 112 can include a transaction layer, link layer, and/or physical layer and can be coupled to host memory 118-1, 118-2, . . . , 118-N via the host memory controller 116. Also, in FIG. 1, host controller 112 is coupled to memory devices 130-1, 130-2, . . . , 130-N via bus 120.

In one or more embodiments, the host controller 112 can be used to communicate information between the number of memory devices 130-1, 130-2, . . . , 130-N and the host 110. One of ordinary skill in the art will appreciate that "a processor" can intend one or more processors, such as a parallel processing system, a number of coprocessors, etc.

In one or more embodiments, the host controller 112 can be coupled to implement a standardized interface. For example, when the memory devices 130-1, 130-2, . . . , 130-N is used for data storage for a memory system, the host controller can implement a serial advanced technology attachment (SATA), a peripheral component interconnect express (PCIe), a universal serial bus (USB), and/or a small computer system interface (SCSI), among other interfaces. In general, however, host controller 112 can be coupled to implement an interface for passing control, address, data and other signals between the memory devices 130-1, 130-2, . . . , 130-N, the host 110, and other devices, such as host memory 118-1, 118-2, . . . , 118-N.

In one or more embodiments, the memory devices 130-1, 130-2, . . . , 130-N can include one or more memory device controllers that can be used to facilitate operations, such as by executing read, write, and/or erase commands, among other operations commands, that are communicated to the memory devices 130-1, 130-2, . . . , 130-N from the host 110. The memory devices 130-1, 130-2, . . . , 130-N can be individually coupled to bus 120. And in some embodiments, the memory devices 130-1, 130-2, . . . , 130-N can be chained together with one of the memory devices coupled to a bus. In one or more embodiments, the one or more memory device controllers can provide a translation layer between host system 110 and the memory devices 130-1, 130-2, . . . , 130-N. Thus, a memory device controller could selectively couple an I/O connector (not shown in FIG. 1) of memory devices 130-1, 130-2, . . . , 130-N to receive the appropriate signal at the appropriate I/O connection at the appropriate time. Similarly, the communication protocol between a host 110 and the memory devices 130-1, 130-2, . . . , 130-N may be different than what is required for access to the memory devices 130-1, 130-2, . . . , 130-N. The memory device controllers could then translate the command sequences received from a host 110 into appropriate command sequences to achieve the desired access to memory devices 130-1, 130-2, . . . , 130-N. Each translation may further include changes in signal voltage levels in addition to command sequences.

The embodiments of FIG. 1 can include additional circuitry that is not illustrated so as not to obscure embodiments of the present disclosure. For example, the memory devices 130-1, 130-2, . . . , 130-N can include address circuitry to latch address signals provided over I/O connectors through I/O circuitry. Address signals can be received and decoded by a row decoder and a column decoder, to access the memory devices 130-1, 130-2, . . . , 130-N. It will be appreciated by those skilled in the art that the number of address input connectors depends on the density and architecture of the memory devices 130-1, 130-2, . . . , 130-N.

In one or more embodiments, the host system can build at least one command, such as a single command or a list of commands. A list of commands can include two or more commands. The host can also allocate data buffers for data transfer and allocate status buffers for command status and completion information in host memory.

The host can notify one or more memory devices via a command message sent over the bus that the command(s) are ready for execution and data buffers and status buffers are allocated in host memory. The message can also contain a pointer to the location (e.g., address) within host memory where the command(s) is located. In relation to the host notifying one or more memory devices that a command(s) is ready for execution (e.g., once the host notifies a memory device that a command is ready), the host relinquishes control of the execution of the command(s) in the command list to the one or more memory devices. The host also relinquishes control of the bus between the host and the one or more memory devices.

In one or more embodiments, once one or more memory devices have been notified that a command(s) is ready in host memory for execution, a memory device can receive the command(s) from the host memory when the memory device desires by sending a data transfer message that contains the pointer to the command(s) to the host controller and additional information such as transfer size, data offset, and data flags. The additional information, such as transfer size, data offset, and data flags, can be referred to as the host memory address context. The transfer size is the amount of data that is sent to a memory device from host memory or sent to host memory from a memory device. The data offset is a value that is used with the pointer to locate the actual location of data in host memory. The offset can be set and modified by a memory device to adjust for the host memory file allocation method. Data flags can be used to identify a feature of a data transfer, such as the direction of the data transfer, among other transfer features associated with executing a data transfer. The host controller will process the host memory address context and retrieve the requested data, such as a command or command list, from host memory and send it to one or more memory devices.

In one or more embodiments, one or more memory devices can interpret the command(s) and control the execution of the command(s) by sending a series of data transfer messages that result in data transfers to and/or from the host memory via the host controller that will retrieve or send data to the host memory.

The data transfer messages can contain a host memory address context that indicates the location of the data within host memory. The data transfers that result from the execution of a command or command list are under control of one or more memory devices. One or more memory devices can determine the timing, sequence, priority, and size of the data transfers based on an individuals device's status and/or ability to execute a given data transfer. In one or more embodiments, the device controls the execution of the command(s), so the host does not manage the state or resources of one or more memory devices or schedule data transfers for one or more memory devices.

In one or more embodiments, when execution of a command is complete, one or more memory devices can send a completion message to the host. The host controller can recognize the completion message and notify the host processor that the command or command list has been completed.

In one or more embodiments, a host can send a message to one or more memory devices indicating that a command or command list is ready for execution and data buffers are allocated in system memory. The message sent from the host to the one or more memory devices can include a pointer, such as an opaque memory pointer object, that can indicate the location of the command in host memory. An opaque memory pointer object can be a pointer that is not interpreted by the memory devices. The opaque memory pointer is sent between the host and the memory devices and is the part of the data transfer messages used to identify the location of data and/or commands in host memory. The opaque memory pointer is interpreted by the host. One or more memory devices can retrieve the command(s) from the host memory. Each command can include a host memory address context. The host memory address context can include additional pointers and transfer size and offset information about the data buffers that will contain or receive the data to be transferred when executing a command.

In one or more embodiments, one or more memory devices can interpret the command(s). Each command will indicate the direction of the data transfer, e.g., send data from one or more memory devices to host memory or send data from host memory to one or more memory devices. The one or more memory devices can execute the command(s) by sending additional data transfer messages to the host to initiate a data transfer. The additional data transfer messages will contain a host memory address context. In some embodiments, if one or more memory devices are sending data to the host memory, the data will follow the host memory address context in the message. In some embodiments, if one or more memory devices are retrieving data from the host memory, the host controller will send a message back to one or more memory devices with a host memory address context followed by the data.

In one or more embodiments, when all data transfers associated with executing a commands) are complete, one or more memory devices can send a message indicating the completion of the command(s). This message can contain a pointer and a host memory address context that indicates the location in host system memory of a status buffer. The status buffer can be a location in host memory that stores data regarding the status of a command(s). Once a command(s) has been executed, the status buffer receives status data that is contained in a completion message that indicates to the host that a command(s) is complete. The status data can be part of the completion message and can follow the host memory address context and can be placed in the status buffer in host memory. The host controller, upon receiving and identifying the completion message, will notify the host processor, e.g., interrupt, that the command(s) has completed processing. The one or more memory devices are now ready to process the next command(s).

Figure 2:
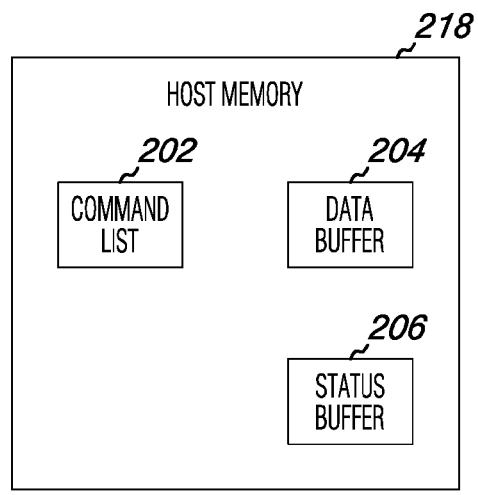
FIG. 2 illustrates a block diagram of host memory in accordance with one or more embodiments of the present disclosure.

FIG. 2 illustrates a block diagram of host memory in accordance with one or more embodiments of the present disclosure. In one or more embodiments, host memory 218 can be remote host memory that is coupled to the host and is physically external to the host. In one or more embodiments, host memory can be embedded host memory that is located on the host. In one or more embodiments, the host memory 218 can include remote host memory and/or embedded host memory.

As discussed above, in one or more embodiments, the host can build a command list 202 in the host system memory 218. The command list 202 can contain two or more commands and each command can contain a basic command descriptor block, which would indicate the basic functionality of the command, memory address context. The memory address context can include information for a data buffer 204 that can indicate transfer direction and whether the data buffer 204 is direct access or indirect access. A data buffer can be a location in host memory where data for a data transfer is written to or read from. In one or more embodiments, a number of data buffers can be used. A direct access buffer is the actual buffer that will contain the data transfer. An indirect access buffer contains additional memory address context information for a number of data buffers, where the data will be divided and stored in a number of data buffers. Methods that use an indirect access buffer can be referred to as scatter/gather access.

As previously discussed, the initial command message from the host to one or more memory devices that indicates a command list 202 is ready to be executed can contain a pointer to the command list 202. To access a direct access buffer, the pointer can include a direct host memory address. To access an indirect access buffer, the pointer can point to other locations that have the data or information regarding where the data is located, such as an address access table, an index into a look-up table within a memory wrapper, and/or a page descriptor, among other system specific implementations of data organization as the same will be known and understood by one of ordinary skill in the art. In both direct access buffers and indirect access buffers, the pointer is interpreted and decoded by the host. The one or more memory devices receive the pointer, but do not attempt to interpret the pointer. The pointer is used as a host memory reference between the one or more memory devices and the host.

In one or more embodiments, a command list can include a single command, multiple commands, or a linked list of commands. A command list structure can be determined by the overall system implementation and does not impact the execution of the command by the one or more memory devices. The host and the one or more memory devices can build, execute, and interpret the command structure using the similar methods.

The host system can send a command message to the one or more memory devices indicating that a command list is available for execution once the command list is build in host system memory. The command message indicates, with a number of pointers, the host system memory location of the command(s) 202, the data buffer 204, and the status buffer 206. The command message can also include additional host memory context information. The command(s) can include the instructions to perform data transfers between the memory device and the host system memory. A data buffer can be a location in host memory where the data for a transfer is written to or read from. The status buffer can be a location in host memory for data regarding the status of the command(s).

In one or more embodiments, one or more memory devices upon receiving a command message can interpret the command message and store the pointer. The one or more memory devices can attempt to retrieve one or more command(s) depending on the memory devices resources and capabilities. In one or more embodiments, the one or more memory devices can receive commands one at a time from a command list on the host memory. In one or more embodiments, the one or more memory devices can receive all of the commands in the command list. The one or more memory devices can also receive a portion of the commands in the command list.

In one or more embodiments, the one or more memory devices can retrieve the command from the host memory by sending data transfer messages to the host. The data transfer messages sent by the one or more memory devices to retrieve commands can be viewed by the host as being the same, e.g., indistinguishable by the host, as the data transfer messages sent by the one or more memory devices to retrieve data from or send data to the host. The bus protocol and the host do not distinguish between data transfer messages for command retrieval or data transfer. The interpretation of the commands and/or data can be handled by the one or more memory devices. The host controller does not interpret data or maintain device or command state information. The host controller can retrieve or deposit data into host memory as directed by the data transfer messages that the host controller receives.

The data transfer messages between the one or more memory devices and the host or between the host and the one or more memory devices can include a packet header. The packet header can include a host memory address context, which can include transfer size, data offset, and flags, among other information.

Figure 3:
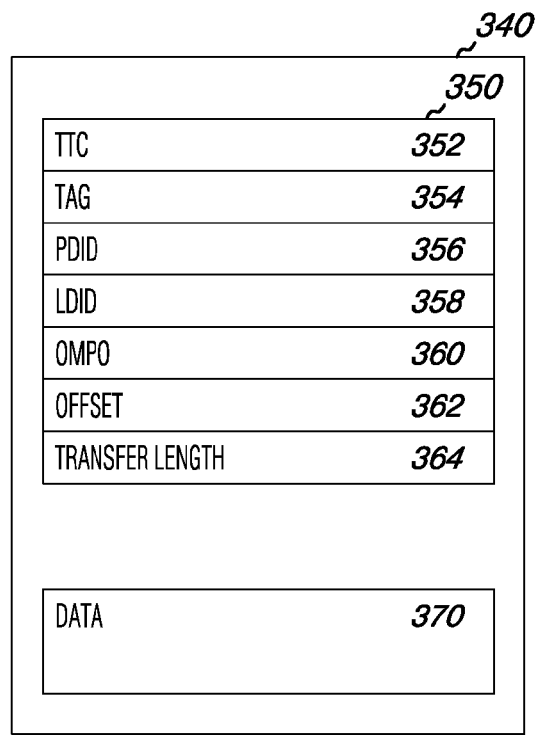
FIG. 3 illustrates a block diagram of a data transfer message in accordance with one or more embodiments of the present disclosure.

FIG. 3 illustrates a block diagram of a data transfer message 340 in accordance with one or more embodiments of the present disclosure. In the in embodiment illustrated in FIG. 3, the data transfer message 340 can include a packet header 350 and data 370. In one or more embodiments, the packet header 350 can include a number of fields that indicate information regarding the data transfer.

In one or more embodiments, the packet header 350 can include a transaction type code (TTC) field 352. The TTC field 352 can be used to indicate the type of transaction for a particular data transfer message. The TTC field 352 can be used to indicate the receiver of the data transfer message and the type of operation the packet header 350 represents, e.g., data will be read from host memory, data will be written to host memory, or data will be written to a memory device, among other types of operations.

In one or more embodiments, the packet header 350 can include a transaction tag (TAG) field 354. The TAG field 354 can be used as an immutable reference count that indicates the phases of a command transaction. The TAG field 354 can be used to track the progress of executing a command if the command is being executed using a number of data transfer messages.

In one or more embodiments, the packet header 350 can include a physical device ID (PDID) field 356. The PDID field 356 can include a number of bits that indicate the physical bus address/ID, the bus number, and channel number, among other physical indentifying features. The PDID field 356 can be used to address the physical location of a particular memory device on the bus and can also indicate to the host which device is sending the data transfer message.

In one or more embodiments, the packet header 350 can include a logical device ID (LDID) field 358. The LDID field 358 can include the logical device address/ID. The LDID field 358 can be used to logically address a particular unit or element within a physical device, such as the host and/or one or more memory devices.

In one or more embodiments, the packet header 350 can include an opaque memory pointer object (OMPO) field 360. The OMPO field 360 can include data that indicates a memory address within host memory. The data in the OMPO field 360 includes data that is host dependent. The data in the OMPO field 360 can be a pointer, such as an opaque memory pointer object. An opaque memory pointer object can be an immutable value and that is not modified by one or more memory devices or the host during the processing of a command. A data transfer message can include a number of pointers, wherein one or more pointers can be for one or more command(s), one or more pointers can be for one or more data buffer(s), and one or more pointers can be for one or more status buffer(s). In a scatter/gather data transfer, more than one data buffer pointer can be used.

In one or more embodiments, the packet header 350 can include an offset field 362. The offset field 362 can include an offset value that can be used to indicate the location of data that is referenced by the pointer. The pointer can be the basis for the location of data and the offset can include a value that is combined with the address in the pointer to find the physical location of data. The pointer and the offset can be used together to indicate the actual address of data in host memory. The offset field 362 can be determined by the memory device. In one or more embodiments, the offset field 362 cannot be modified by one or more memory devices or the host during the processing of a command. In one or more embodiments, the offset is system dependent.

In one or more embodiments, the packet header 350 can include a transfer length field 364. The transfer length field 364 can include the amount of data, e.g., the number of words and/or size of data transfers, to transfer during the data transfer indicated in the data transfer message.

In one or more embodiments, a data transfer message 340 can include data 370. When data is being read from one or more memory devices and written to host memory, a data transfer message that includes data 370 is sent from one or more memory devices to the host. When data is being read from host memory and written to one or more memory devices, a data transfer message that includes data 370 is sent from the host to one or more memory devices.

One or more memory devices can determine how many data transfer messages to send, the size of the data packets, and the direction of the data transfer when executing a command. The one or more memory devices do not require host intervention or tracking of the data transfers or the device state. The one or more memory devices can send data transfer messages and/or completion messages to the host controller. The types of transfer are indicated in the packet header by the TTC, which can be a data transfer request, e.g., read, or a data transfer response, e.g., write, among other transfer types. In one or more embodiments, one or more data transfer requests or data transfer responses can be used to execute a command, depending on the block size of the host memory and/or the one or more memory devices and the protocol packet size, for example. The one or more memory devices can determine the number of transactions that will occur to execute a command and when to send the data transfer messages. The one or more memory devices can queue the commands based on the timing, sequence, and priority determined by the one or more memory devices. The data transfer messages executing a command(s) can be sent in any order that the one or more memory devices indicates.

In one or more embodiments, the host controller can be configured to respond via hardware and/or firmware to the transaction type codes (TTCs) in the packet header. The ability for the host control to respond to the TTCs allows the host to not maintain state information for a transaction or status information for one or more memory devices, e.g., the host operates in a stateless manner.

In one or more embodiments, the host controller can be configured to respond via firmware and/or hardware in the memory address context in the packet header. In such embodiments, the host controller can support a first party direct memory access (FPDMA) transfer of data. The transfer of data between the host and one or more memory devices can occur without host intervention.

One or more memory devices can send a completion message to the host through the host controller upon completion of a data transfer. The completion message can indicate the status of the recently executed command(s). The completion message can also indicate the status of one or more memory devices. The one or more memory devices can receive the status buffer location in the host memory via a pointer that can be included in the data transfer message from the host system to one or more memory devices that indicates a command(s) was ready for execution. The completion message can include a pointer to the status buffer.

The host controller can transfer the status data in the completion message into the status buffer and can notify the host, in a host dependent fashion, that the completion message has been received and stored. The notification can be completed by any means available to a host to indicate the completion of executing a command(s). In some embodiments, this notification is via an interrupt mechanism implemented within the host.

CONCLUSION

The present disclosure includes methods, devices, and systems for controlling host memory access with a memory device. One embodiment for controlling host memory access with a memory device includes receiving at least one command(s) from a host and controlling execution of at least one command(s) with the memory device.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. As used herein, the term "and/or" includes any and all combinations of one or more of the associated listed items.

It will be understood that, although the terms first, second, etc. may be used herein to describe various elements and that these elements should not be limited by these terms. These terms are only used to distinguish one element from another element. Thus, a first element could be termed a second element without departing from the teachings of the present disclosure.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for controlling host memory access with a memory device, comprising:
   receiving at least one command from a host at the memory device, wherein the at least one command is created in host memory and is located in host memory by the memory device via a pointer that is sent to the memory device by the host in a command message; and
   controlling execution of the at least one command with the memory device by sending a first data transfer message to the host in response to receiving the pointer from the host, wherein the first data transfer message includes a packet header having a transaction type code, a transaction tag, a physical device ID, a logical device ID, a pointer, an offset, and a transfer length and wherein the host responds to the transaction type code by writing data from the first data transfer message to the host memory.

2. The method of claim 1, wherein the method includes receiving the pointer from the host to locate at least one command stored in host memory.

3. The method of claim 2, wherein the method includes sending a second data transfer message from the memory device to the host and wherein the second data transfer message includes the pointer to locate at least one command in host memory.

4. The method of claim 1, wherein controlling execution of the at least one command with the memory device includes determining the timing, sequence, and size of data transfers.

5. The method of claim 4, including determining the timing, sequence, and size of data transfers based on memory device status and/or ability to execute at least one command.

6. The method of claim 1, wherein the packet header includes a host memory address context.

7. The method of claim 6, wherein the host memory address context includes transfer size, data offset, and data flags.

8. A method for controlling host memory access with a memory device, comprising:
   receiving a command message from a host to inform the memory device that at least one command on host memory is ready for execution;
   retrieving the at least one command from host memory by using a pointer received from the host to locate the at least one command;
   executing the at least one command under control of the memory device by sending a first data transfer message to the host in response to receiving the pointer from the host, wherein the first data transfer message includes a packet header having a transaction type code, a transaction tag, a physical device ID, a logical device ID, a pointer, an offset, and a transfer length and wherein the host responds to the transaction type code by locating data in the host memory and transferring the data located in the host memory to the memory device; and
   sending a completion message to the host to notify the host that the at least one command has completed.

9. The method of claim 8, wherein the command message includes an opaque memory pointer object that points to an address within host memory where the at least one command is located.

10. The method of claim 8, wherein the host relinquishes control of execution of the at least one command in association with sending the command message.

11. The method of claim 8, wherein the host relinquishes control of a bus between the host and the memory device in association with sending the command message.

12. The method of claim 8, wherein retrieving the at least one command includes sending a second data transfer message with an opaque memory pointer object, transfer size, data offset, and data flags to a controller of the host.

13. The method of claim 12, wherein retrieving the at least one command includes processing the second data transfer message with the host controller and transferring at least one command from the host to the memory device.

14. A system, comprising:
   a memory device; and
   a host, wherein data transfers between the host and the memory device are controlled by the memory device by
      receiving a command message at the memory device from the host that includes a pointer to locate commands stored in host memory, by sending a first number of data transfer messages, which include the pointer, from the memory device to the host to retrieve the commands, and by sending a second number of data transfer messages to the host that include a number of packet headers having a number of transaction type codes, transaction tags, physical device IDs, logical device IDs, pointers, offsets, and transfer lengths in response to receiving the pointer from the host and wherein the host responds to the number of transaction type codes by writing data from the second number of data transfer messages to the host memory.

15. The system of claim 14, wherein the memory device controls a bus and the data transfers through the bus.

16. The system of claim 14, wherein the memory device controls the timing and sequence of data transfers to the host.

17. The system of claim 14, wherein the first number of data transfer messages contain a pointer to at least one command.

18. The system of claim 17, wherein the host is configured to build the at least one command and allocate a data buffer and a status buffer in host memory.

19. The system of claim 14, wherein the second number of transfer messages include the number of packet headers containing a host memory address context.

20. The system of claim 14, wherein the memory device includes control circuitry configured to process one or more commands to determine the second number of data transfer messages to send, the size of the data transfers, and the direction of the data transfers.

21. A memory device, comprising:
an interface coupling the memory device to a host; and
wherein the memory device is configured to receive a command message from the host that includes a pointer to at least two commands stored in host memory, send a first data transfer message that includes the pointer to the host to locate and retrieve the at least two commands in host memory and to prioritize, sequence, and queue the at least two commands, and control execution of the at least two commands by sending a second data transfer message to the host that includes a transaction type code, in response to receiving the pointer from the host, which causes the host to locate data in the host memory and transfer the data located in the host memory to the memory device.

22. The device of claim 21, wherein the memory device is configured to send the second data transfer message that contains a packet header to a host controller during command execution.

23. The device of claim 21, wherein the memory device is configured to maintain and control a state and status information for a data transfer.

24. The device of claim 21, wherein the memory device is configured to prioritize, sequence, and queue the at least two commands based on memory device status and/or ability to execute the at least two commands.

* * * * *